March 1, 1927.  O. WODKE  1,619,687

SEED DISPENSER

Filed Aug. 30, 1926

Inventor:
O. Wodke
By: Marks & Clerk
Attys.

Patented Mar. 1, 1927.

1,619,687

UNITED STATES PATENT OFFICE.

OTTO WODKE, OF ROSTOCK, GERMANY, ASSIGNOR OF ONE-HALF TO THE FIRM ACTIEN GESELLSCHAFT "NEPTUN" SCHIFFSWERFT UND MASCHINENFABRIK, OF ROSTOCK, GERMANY.

SEED DISPENSER.

Application filed August 30, 1926, Serial No. 132,599, and in Germany April 4, 1925.

This invention relates to sowing machines, the blades or scoops of which are capable of being adjusted for different ways of sowing (single grain, thin or thick sowing) and for any kind of seed or cereal or size of grain without changing or inserting special wheels.

This problem which is not new in itself is solved by the present invention by the blades or scoops which extended through a surrounding drum in a known manner so as to scoop up the seed being fixed alternately tangentially to different driving discs, such that they can be adjusted or withdrawn into the drum either all together by simultaneously turning the driving discs or in sets by turning separate driving discs. This also makes it possible to vary the distance apart of the sown seeds, by putting a set (or a number of) the scoops out of operation through withdrawing them into the drum.

In consequence of this great adaptability of the sowing apparatus the machine is capable of sowing the most varied kinds of seeds. For adapting the feed of the seeds to the scoops to the peculiar nature of any particular seed, according to the present invention a rotatable flap is provided in the seed container, which according as it is set allows the seeds to reach the scoops or blades from the front or from above. When the seeds are fed from above, which is necessary in the case of very bulky and felty seed, according to the invention there may be provided in the upper part of the seed container a spring loaded cover which presses on the seeds. A spring which presses against the scoops provides positive feeding means for the seeds.

Figure 1:
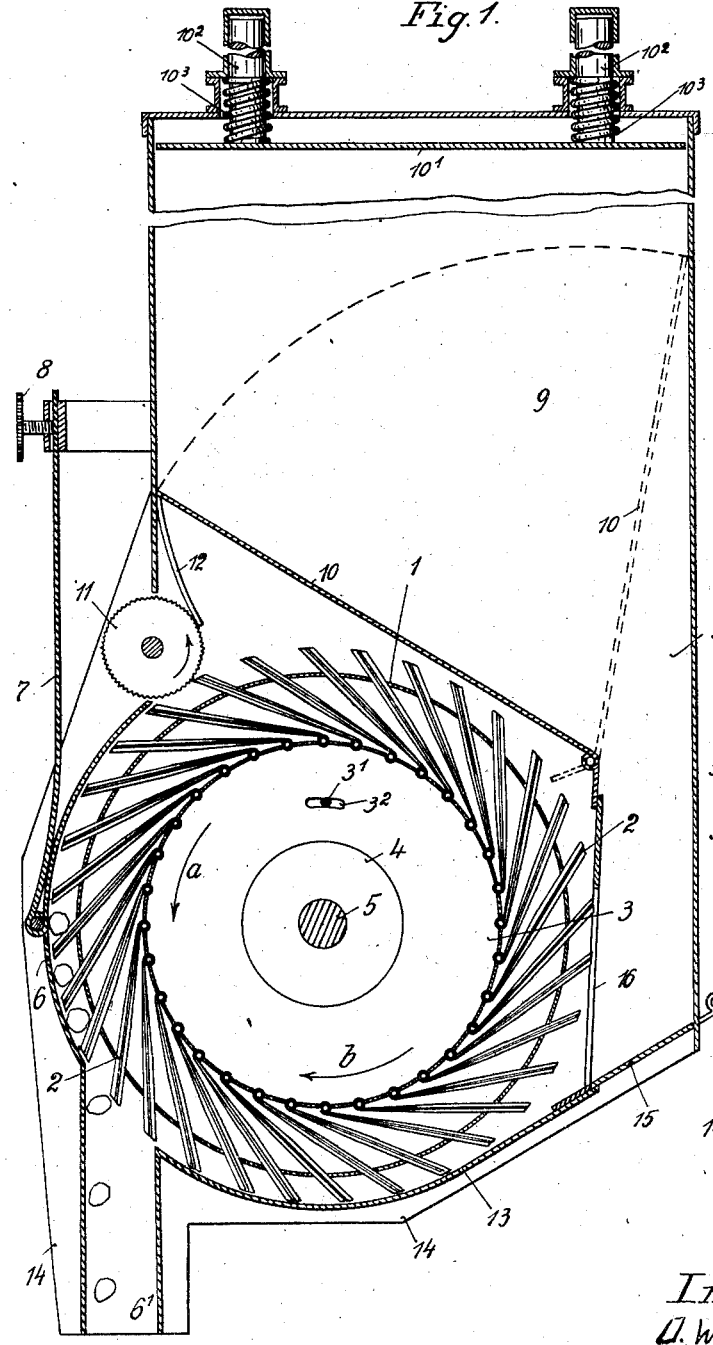
Figure 2:
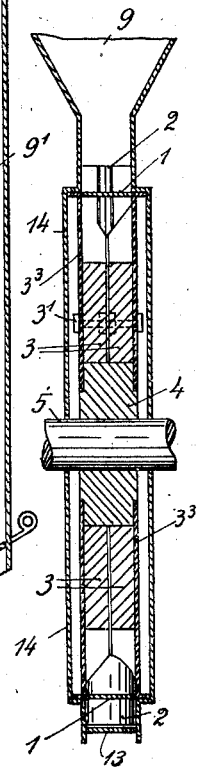

The accompanying drawing shows a constructional example of the invention,

Fig. 1 being a longitudinal section, and Fig. 2 a transverse section.

Through the drum 1 surrounding the sowing wheel there project in a known manner the adjustable scoops or driving members 2, which are fixed tangentially on the disc 3 which is loosely mounted on the sleeve 4 of the shaft. This disc 3 is composed of a plurality of plates lying next to one another to which the scoops are attached alternately in sets. Figure 2 shows the manner in which the disc 3 is built up of two plates which alternately support the scoops. The disc parts or plates which can be turned together with respect to the drum 1, for the purpose of allowing the scoops to project to a greater or less extent within the drum 1 determining the quantity sown, are also capable of being adjusted with respect to one another, so that for instance one set of the scoops 2 can be entirely withdrawn into the drum 1, whereby the distance between the separate scoops on the surface of the drum 1 may be increased so as to be twice as great and so on, and can be reduced again in a corresponding manner. This not only permits of the smallest seeds and of the largest kinds of grain being carried along by the scoops 2 in the quantities desired, but also permits of the distance between the separate grains or furrows being changed.

The discs 3 are fixed with respect to one another by means of the screws $3^1$ which pass through the slots $3^2$ in the covering discs $3^3$. The disc 4 derives its rotary motion through the shaft 5 in a known manner from the road wheels of the machine. The sowing wheel is put into and out of operation by means of any suitable coupling.

On the sowing wheel rotating in the direction shown by the arrow, the scoops 2 scoop the seed out of the container 9 or $9^1$ in adjustable quantities, single grains, or grains for sowing thickly or thinly and throw them into the outlet pipe $6^1$. For preventing the seeds falling from the scoops 2 prematurely, the seeds after passing over the apex of the sowing wheel are guided in a positive manner by the covering spring which is pressed by the tension spring 7 close up against the outer ends of the scoops 2. The spring 7 can be adjusted by means of the adjusting screw 8. The covering spring 6 lies between the two protecting side plates 14 which extend around the entire drum surface 1 of the sowing wheel, whereby the seed is positively guided everywhere on the drum surface 1 and between the scoops 2. As soon as the seeds have left the covering spring 6, they pass through the outlet $6^1$ into the furrow.

Very bulky and felty seeds which the scoops cannot take up separately from the container $9^1$ are fed to the scoops 2 from above. For this purpose the flap 10 in the seed container 9 is thrown over in the direction of the arrow, so that the lateral inlet 9¹ of the seed container 9 is shut off. In this case the scoops 2 scoop away the seeds from below and pass them along the covering spring 6 to the outlet 6¹. In order to prevent the seeds being bruised and jamming at the place where they enter behind the covering spring 6, a rotatable strickling wheel 11 with a protective spring 12 is located in front of the spring 6. In order to ensure bulky and felty seeds falling from the container 9 to the scoops 2, a slidable cover 10¹ is provided below the cover of the seed container within the latter, which is guided positively by the pins 10² and is pressed by means of the springs 10³ on to the seeds in the container, thus ensuring that the seeds will be carried along uniformly by the scoops 2.

When it is impossible for the seeds to be scooped either from the lateral part 9¹ of the container or at the top from the container 9, when the sowing wheel is turning in the direction $a$, by reversing the direction of rotation in the direction of the arrow $b$ the sowing wheel is used as a push wheel. In this case the scoops 2 remove the seeds from the part 9¹ of the seed container with their rear sides. In order to regulate the quantity of seed sown, besides the speed of revolution of the wheel the amount by which the scoops 2 project beyond the drum 1 is suitably varied, as already described. When the seeds are carried round in this manner in the lower part of the container by the scoops 2, the sides 14 of the container and the covering spring 13 provide a positive guide for the same. The covering spring 13 is kept close to the outer ends of the scoops 2 either by its own resilience or by being adjusted in a suitable manner. The slide 15 is provided for emptying the seed container 9. By adjusting the slide 16 the quantity of seed fed to the sowing wheel or to the scoops or blades 2 can be regulated.

What I claim is:

1. A sowing machine, comprising in combination a seed container, a sowing wheel mounted so as to rotate in the said container, a plurality of driving discs in the said wheel, scoops attached in groups to the said driving discs, a drum surrounding the said driving discs and having openings through which the scoops extend, the driving discs being capable of being rotated jointly relatively to the said drum and also independently with respect to one another as and for the purpose set forth.

2. A sowing machine, comprising in combination a seed container, a sowing wheel mounted so as to rotate in the said container, a plurality of driving discs in the said wheel, scoops attached in groups to the said driving discs, a pivoted flap in the container for guiding, according as it is set, the contents of the container to the scoops from the front or from above, a drum surrounding the said driving discs and having openings through which the scoops extend, the driving discs being capable of being rotated jointly relatively to the said drum and also independently with respect to one another as and for the purpose set forth.

3. A sowing machine, comprising in combination a seed container, a sowing wheel mounted so as to rotate in the said container, a plurality of driving discs in the said wheel, scoops attached in groups to the said driving discs, a covering spring surrounding a portion of the scoops, an adjustable spring for pressing the said covering spring close up to the outer ends of the scoops for providing a positive guide for the contents of the container, a drum surrounding the said driving discs and having openings through which the scoops extend, the driving discs being capable of being rotated jointly relatively to the said drum and also independently with respect to one another as and for the purpose set forth.

4. A sowing machine, comprising in combination a seed container, an outer cover on the container, a slidable inner cover below the outer cover, means for positively guiding the inner cover with respect to the outer cover, springs for pressing the inner cover on to the contents of the container, a sowing wheel mounted so as to rotate in the said container, a plurality of driving discs in the said wheel, scoops attached in groups to the said driving discs, a drum surrounding the said driving discs and having openings through which the scoops extend, the driving discs being capable of being rotated jointly relatively to the said drum and also independently with respect to one another as and for the purpose set forth.

In testimony whereof I have signed my name to this specification.

OTTO WODKE.